US011983935B2

(12) United States Patent
Agarwal et al.

(10) Patent No.: US 11,983,935 B2
(45) Date of Patent: *May 14, 2024

(54) ESTIMATING AUTO EXPOSURE VALUES OF CAMERA BY PRIORITIZING OBJECT OF INTEREST BASED ON CONTEXTUAL INPUTS FROM 3D MAPS

(71) Applicant: FORD GLOBAL TECHNOLOGIES, LLC, Dearborn, MI (US)

(72) Inventors: Neetu Agarwal, Menlo Park, CA (US); Ravi Basavaraj, Sunnyvale, CA (US); Richard L. Kwant, San Bruno, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/069,790

(22) Filed: Dec. 21, 2022

(65) Prior Publication Data

US 2023/0118105 A1 Apr. 20, 2023

Related U.S. Application Data

(63) Continuation of application No. 17/118,768, filed on Dec. 11, 2020, now Pat. No. 11,562,572.

(51) Int. Cl.
*G06V 10/25* (2022.01)
*G05D 1/00* (2006.01)
(Continued)

(52) U.S. Cl.
CPC ........... *G06V 20/58* (2022.01); *G05D 1/0088* (2013.01); *G05D 1/0212* (2013.01); *G06T 7/73* (2017.01);
(Continued)

(58) Field of Classification Search
CPC .... G06T 7/70; G06T 7/73; G06T 7/80; G06T 2207/10144; G06T 2207/30248;
(Continued)

(56) References Cited

U.S. PATENT DOCUMENTS 7,133,069 B2 11/2006 Wallach et al.
7,538,801 B2 5/2009 Hu et al.
(Continued)

FOREIGN PATENT DOCUMENTS

DE 102004047476 A1 4/2006
WO 2020054240 A1 3/2020
(Continued)

OTHER PUBLICATIONS

International Search Report and Written Opinion dated Mar. 3, 2022 for Application No. PCT/US2021/058403 (13 pages).
(Continued)

*Primary Examiner* — Andrew W Johns
(74) *Attorney, Agent, or Firm* — Frank A. MacKenzie; Brooks Kushman, P.C.

(57) ABSTRACT

Systems and methods are provided for operating a vehicle, is provided. The method includes, by a vehicle control system of the vehicle, identifying map data for a present location of the vehicle using a location of the vehicle and pose and trajectory data for the vehicle, identifying a field of view of a camera of the vehicle, and analyzing the map data to identify an object that is expected to be in the field of view of the camera. The method further includes, based on (a) a class of the object, (b) characteristics of a region of interest in the field of view of the vehicle, or (c) both, selecting an automatic exposure (AE) setting for the camera. The method additionally includes causing the camera to use the AE setting when capturing images of the object, and using the camera, capturing the images of the object.

20 Claims, 5 Drawing Sheets

(51) Int. Cl.
*G06T 7/73* (2017.01)
*G06V 10/60* (2022.01)
*G06V 20/58* (2022.01)

(52) U.S. Cl.
CPC .............. *G06V 10/25* (2022.01); *G06V 10/60* (2022.01); *G05D 2201/0213* (2013.01); *G06T 2207/30261* (2013.01)

(58) Field of Classification Search
CPC ........ G06V 10/25; G06V 10/60; G06V 20/56; H04N 5/235; H04N 5/2351; H04N 5/2353; H04N 23/70; H04N 23/71; H04N 23/72
See application file for complete search history.

(56) References Cited

U.S. PATENT DOCUMENTS

| | | |
|---|---|---|
| 7,884,879 B2 | 2/2011 | Miyazaki |
| 8,195,394 B1 | 6/2012 | Zhu et al. |
| 8,488,015 B2 | 7/2013 | Prentice et al. |
| 8,559,673 B2 | 10/2013 | Fairfield et al. |
| 8,736,710 B2 | 5/2014 | Spielberg |
| 8,751,154 B2 | 6/2014 | Zhang et al. |
| 8,874,372 B1 | 10/2014 | Zhu et al. |
| 9,141,107 B2 | 9/2015 | Ferguson et al. |
| 9,454,154 B1 | 9/2016 | Safarik |
| 9,654,738 B1 | 5/2017 | Ferguson et al. |
| 9,707,960 B2 | 7/2017 | Gutmann et al. |
| 9,921,585 B2 | 3/2018 | Ichikawa et al. |
| 11,562,572 B2 * | 1/2023 | Agarwal et al. ....... H04N 23/73 |
| 2009/0174573 A1 | 7/2009 | Smith |
| 2012/0274481 A1 | 11/2012 | Ginsberg et al. |
| 2018/0054559 A1 | 2/2018 | Welker |
| 2021/0201070 A1 | 7/2021 | Omari et al. |
| 2021/0203828 A1 | 7/2021 | Ghose et al. |

FOREIGN PATENT DOCUMENTS

| | | |
|---|---|---|
| WO | 2020071683 A1 | 4/2020 |
| WO | 2020082745 A1 | 4/2020 |

OTHER PUBLICATIONS

Information about Related Patents and Patent Applications, see the accompanying Information Disclosure Statement Letter, which concerns Related Patents and Patent Applications.

* cited by examiner

ESTIMATING AUTO EXPOSURE VALUES OF CAMERA BY PRIORITIZING OBJECT OF INTEREST BASED ON CONTEXTUAL INPUTS FROM 3D MAPS

CROSS-REFERENCE AND CLAIM OF PRIORITY

This patent application claims priority to U.S. patent application Ser. No. 17/118,768 filed Dec. 11, 2020, now U.S. Pat. No. 11,562,572, issued on Jan. 24, 2023, the entirety of which is incorporated herein by reference.

BACKGROUND

Statement of the Technical Field

The present disclosure relates to object identification and, in particular, to estimating camera exposure values by identifying and prioritizing objects of interest.

BACKGROUND

Object detection and analyzation are critical to safe driving, particularly pertaining to automatic vehicles. One such type of object that requires particular care in identifying and analyze is a traffic signal. Traffic signals indicate when it is the safe, legal, and appropriate time for vehicles to pass or enter certain intersections or other regions. For this reason, autonomous vehicles require the ability to accurately detect and analyze traffic signals.

Traffic signal devices may be detected using standard object detection techniques, and, in the field of self-driving or autonomous cars or other vehicles, deep neural networks are often used for object detection and classification. In a typical object detection task, a neural network is configured to locate an arbitrary number of objects in a scene. Since traffic signal devices are often mapped, some prior knowledge at a particular location may be known. Examples include what kinds or types of objects should be present in the scene and what their rough sizes are.

Viewing and isolating a traffic signal device from actors and/or other objects in a scene is not necessarily a straightforward process. Static objects may be visible only from a particular location and angle, making it difficult to isolate and analyze the static object. Additionally, lighting in real world scenarios is not always perfect. The automatic exposure settings of a vehicle's camera system may be optimized to capture images of specific classes of targets (such as traffic signals or pedestrians), but optimization of exposure settings for one class can make the detection of other object classes in the image challenging. In addition, objects may, for example, be positioned in low light areas and/or high dynamic range areas. It is challenging to preserve all the details in an image captured by camera sensors in low light or high dynamic range scenes. Lack of details and information loss both present challenges for detection, classification, and/or other AI-based processing for objects of interest, such as traffic signals, tunnel entries or exits, pedestrians, etc.

Therefore, for at least these reasons, a better method of efficiently and accurately detecting and classifying objects in scenes, independent of the lighting or dynamic range, is needed.

SUMMARY

According to various aspects of the present disclosure, a method of operating a vehicle, is provided. The method includes, by a vehicle control system of the vehicle, identifying map data for a present location of the vehicle using a location of the vehicle and pose and trajectory data for the vehicle, identifying a field of view of a camera of the vehicle, and analyzing the map data to identify an object that is expected to be in the field of view of the camera. The method further includes, based on (a) a class of the object, (b) characteristics of a region of interest in the field of view of the vehicle, or (c) both, selecting an automatic exposure (AE) setting for the camera. The method additionally includes causing the camera to use the AE setting when capturing images of the object, and using the camera, capturing the images of the object.

According to various embodiments, the selecting the AE setting further includes using the map data to determine the region of interest in the field of view of the camera, and analyzing an image of the field of view of the camera that the camera captured to determine a luminance level of one or more pixels within the region of interest. The region of interest is a region of the field of view of the camera that is expected to contain the object.

According to various embodiments, the selecting the AE setting further includes determining whether the luminance level of the pixels within the region of interest matches a target level.

According to various embodiments, the method further includes, upon identifying that the luminance level of the pixels within the region of interest matches the target level, analyzing the object to acquire data pertaining to the object.

According to various embodiments, the method further includes, upon identifying that the luminance level of the pixels within the region of interest does not match the target level, adjusting the AE settings so that a luminance of pixels in the image of the field of view of the camera is consistent with the target level.

According to various embodiments, the method further includes determining a class of the object.

According to various embodiments, the method further includes determining the region of interest.

According to various embodiments, the method further includes determining the location of the vehicle, and receiving, from one or more vehicle sensors, the pose and trajectory data for the vehicle.

According to various embodiments, the vehicle is an autonomous vehicle.

According to another aspect of the present disclosure, a method of operating a vehicle is provides. The method includes, by a vehicle control system of a vehicle, determining a trajectory of the vehicle, identifying map data for a present location of the vehicle, and analyzing the map data to identify an object that is expected to be in a field of view of a camera of the vehicle and determine a class of the object. The method further includes, based on (a) a class of the object, (b) characteristics of a region of interest in the field of view of the camera, or (c) both, selecting an automatic exposure (AE) setting for the camera. The method additionally includes causing the camera to use the AE setting when capturing images of the object.

According to various embodiments, the region of interest is a region of the field of view of the camera that is expected to contain the object.

According to various embodiments, the method further includes analyzing an image of the field of view of the camera that the camera captured to determine a luminance level of one or more pixels within the region of interest.

According to various embodiments, the selecting the AE setting further includes determining whether the luminance level of the pixels within the region of interest matches a target level.

According to various embodiments, the method further includes, upon identifying that the luminance level of the pixels within the region of interest matches the target level, analyzing the object to acquire data pertaining to the object.

According to various embodiments, the method further includes, upon identifying that the luminance level of the pixels within the region of interest does not match the target level, adjusting the AE settings so that a luminance of pixels in the image of the field of view of the camera is consistent with the target level.

According to various embodiments, the identifying map data includes using the trajectory to identify the map data.

According to various embodiments, the method further includes receiving, from one or more vehicle sensors, a pose and trajectory data for the vehicle.

According to various embodiments, the vehicle is an autonomous vehicle.

DETAILED DESCRIPTION

Figure 1:
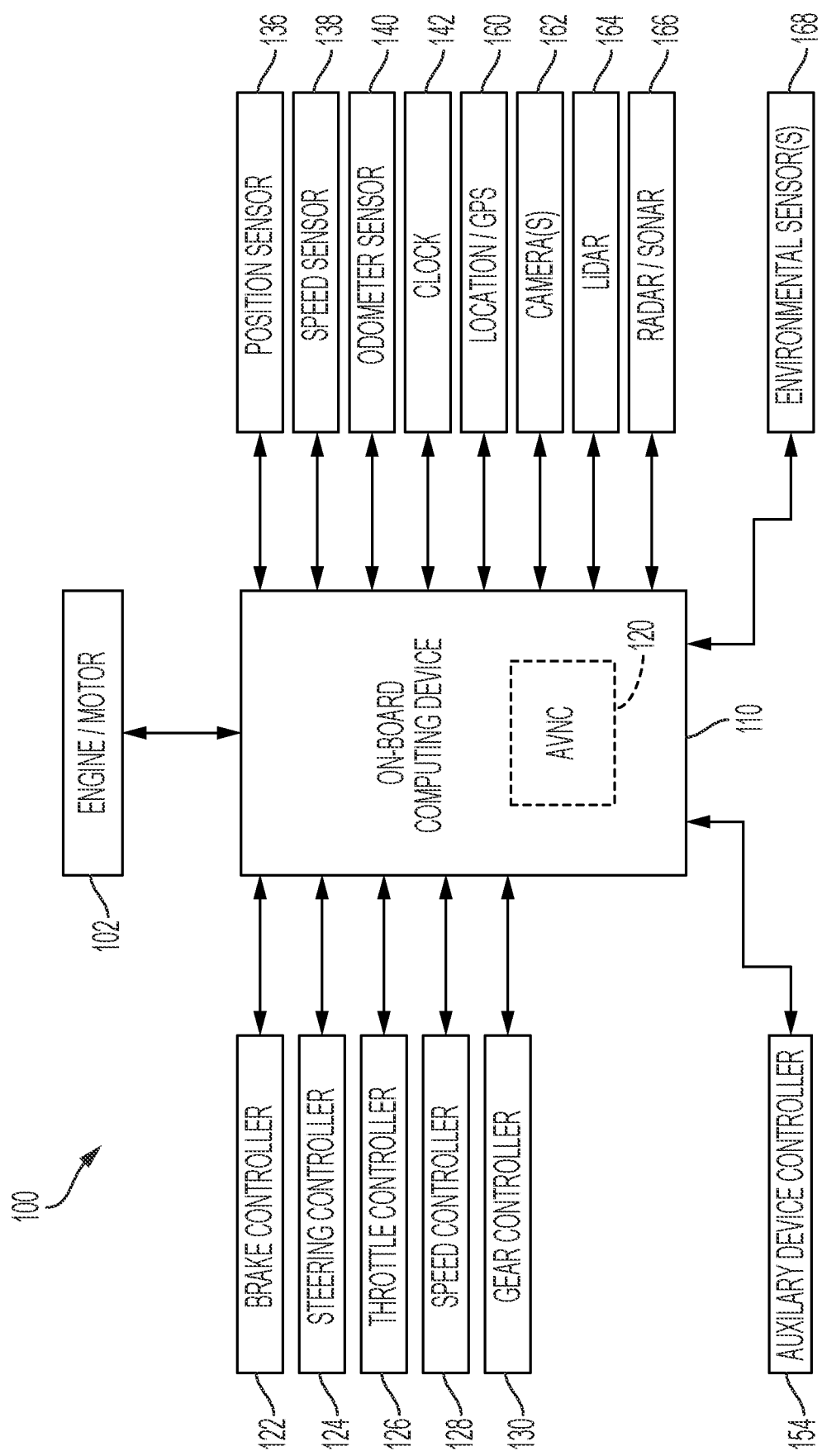
FIG. 1 illustrates example elements of an autonomous vehicle, in accordance with various embodiments of the present disclosure.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions. Alternatively, it may be semi-autonomous in that a human operator may be required in certain conditions or for certain operations, or a human operator may override the vehicle's autonomous system and may take control of the vehicle, or it may be a human-operated vehicle that is equipped with an advanced driver assistance system.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

FIG. 1 illustrates an example system architecture 100 for a vehicle, such as an autonomous vehicle (AV). The vehicle may include an engine or motor 102 and various sensors for measuring various parameters of the vehicle and/or its environment. Operational parameter sensors that are common to both types of vehicles include, for example: a position/motion sensor 136 such as an accelerometer, gyroscope and/or inertial measurement unit (IMU); a speed sensor 138; and an odometer sensor 140. The vehicle also may have a clock 142 that the system architecture 100 uses to determine vehicle time during operation. The clock 142 may be encoded into the vehicle on-board computing device 110, it may be a separate device, or multiple clocks may be available.

The vehicle also may include various sensors that operate to gather information about the environment in which the vehicle is traveling. These sensors may include, for example: a location and/or position sensors 160 such as a GPS device; fuel sensors; occupancy sensors; object detection sensors such as one or more cameras 162; a light detection and ranging (LIDAR) sensor system 164; and/or a radar and or and/or a sonar system 166. The sensors also may include environmental sensors 168 such as a precipitation sensor, humidity sensor, and/or ambient temperature sensor. The object detection sensors may enable the vehicle to detect objects that are within a given distance or range of the vehicle in any direction, while the environmental sensors collect data about environmental conditions within the vehicle's area of travel. The system architecture 100 will also include one or more cameras 162 for capturing images of the environment. The sensor data can include information that describes the location of objects within the surrounding environment of the AV, information about the environment itself, information about the motion of the AV, information about a route of the AV, or the like. As the AV travels over a surface, at least some of the sensors may collect data pertaining to the surface.

During operations, information is communicated from the sensors to an on-board computing device 110. The on-board computing device 110 analyzes the data captured by the sensors and optionally controls operations of the vehicle based on results of the analysis. For example, the on-board computing device 110 may control braking via a brake controller 122; direction via a steering controller 124; speed and acceleration via a throttle controller 126 (in a gas-powered vehicle) or a motor speed controller 128 (such as a current level controller in an electric vehicle); a differential gear controller 130 (in vehicles with transmissions); and/or other controllers such as an auxiliary device controller 154. The on-board computing device 110 may include an autonomous vehicle navigation controller (or control system) 120 configured to control the navigation of the vehicle through an intersection. In some embodiments, the intersection may include traffic signals. In some embodiments, an intersection may include a smart node. In some embodiments, the on-board computing device 110 may be configured to switch modes (augmented perception mode and non-augmented perception mode) based on whether Augmented Perception Data (APD) is available if the vehicle is in-range of an intersection.

Geographic location information may be communicated from the location sensor 160 to the on-board computing device 110, which may then access a map of the environment that corresponds to the location information to determine known fixed features of the environment such as streets, buildings, stop signs and/or stop/go signals. Captured images from the cameras 162 and/or object detection information captured from sensors such as a LiDAR system 164 is communicated from those sensors) to the on-board computing device 110. The object detection information and/or captured images may be processed by the on-board computing device 110 to detect objects in proximity to the vehicle. In addition or alternatively, the vehicle may transmit any of the data to a remote server system for processing. Any known or to be known technique for making an object detection based on sensor data and/or captured images can be used in the embodiments disclosed in this document.

The radar system may be considered as an object detection system that may be configured to use radio waves to determine characteristics of the object such as range, altitude, direction, or speed of the object. The radar system may be configured to transmit pulses of radio waves or microwaves that may bounce off any object in a path of the waves. The object may return a part of energy of the waves to a receiver (e.g., dish or antenna), which may be part of the radar system as well. The radar system also may be configured to perform digital signal processing of received signals (bouncing off the object) and may be configured to identify the object. The received signals or radar-based information may be indicative, for example, of dimensional characteristics of a given surface.

The LIDAR system 164 may include a sensor configured to sense or detect objects in an environment in which the AV is located using light. Generally, the LIDAR system 164 is a device that incorporates optical remote sensing technology that can measure distance to, or other properties of, a target (e.g., a ground surface) by illuminating the target with light. As an example, the LIDAR system 164 may include a laser source and/or laser scanner configured to emit laser pulses and a detector configured to receive reflections of the laser pulses. For example, the LIDAR system 164 may include a laser range finder reflected by a rotating mirror, and the laser is scanned around a scene being digitized, in one, two, or more dimensions, gathering distance measurements at specified angle intervals. The LIDAR system 164, for example, may be configured to emit laser pulses as a beam, and scan the beam to generate 2-dimensional or 3-dimensional range matrices. In an example, the range matrices may be used to determine distance to a given vehicle or surface by measuring time delay between transmission of a pulse and detection of a respective reflected signal. In some examples, more than one LIDAR system 164 may be coupled to the first vehicle to scan a complete 360° horizon of the first vehicle. The LIDAR system 164 may be configured to provide to the computing device a cloud of point data representing the surface(s), which have been hit by the laser, on the road. The points may be represented by the LIDAR system 164 in terms of azimuth and elevation angles, in addition to range, which can be converted to (X, Y, Z) point data relative to a local coordinate frame attached to the vehicle. Additionally, the LIDAR system 164 may be configured to provide intensity values of the light or laser reflected off the surfaces the road that may be indicative of a surface type. In examples, the LIDAR system 164 may include components such as light (e.g., laser) source, scanner and optics, photodetector and receiver electronics, and position and navigation system. In an example, The LIDAR system 164 may be configured to use ultraviolet (UV), visible, or infrared light to image objects and can be used with a wide range of targets, including non-metallic objects. In one example, a narrow laser beam can be used to map physical features of an object with high resolution.

A camera 162 may be any camera (e.g., a still camera, a video camera, etc.) configured to capture images of the environment in which the AV is located. The cameras 162 can be used to collect other details of the objects that other sensors cannot sense. In addition, a pair of cameras 162 can be used to determine distance from the cameras to the surface over which the AV is travelling using methods such as triangulation.

It should be noted that the sensors for collecting data pertaining to the surface may be included in systems other than the AV such as, without limitation, other vehicles (autonomous or driven), ground or aerial survey systems, satellites, aerial mounted cameras, infrared sensing devices, other robots, machines, or the like.

In order to avoid collision with one or more stationary objects or moving actors, and in order to ensure adherence to relevant traffic laws and regulations, an AV must be programmed to follow a route which can be dynamically adjusted based on the road and any external objects and/or actors which the AV comes across. For example, the trajectory of the AV may be determined by a route planner and an onboard stack. According to various embodiments, the route planner may be controlled by the AV control system 120.

The AV may obtain various information pertaining to its surroundings using various cameras 136, motion sensors 138, 140, and/or other sensing devices 142, 160, 162, 164, 166, 168, which measure data surrounding the AV. However, in various embodiments, the AV may obtain information pertaining to an environment prior to entering an environment. For example, the route planner may incorporate a map of an area surrounding, or about to surround, the AV, providing the AV with prior information about the environment. This aids in predicting the location of one or more static objects along the AV's trajectory. These static objects may include, for example, traffic signals, bridges, tunnels, barriers or other physical obstacles, and/or the like. The location and position data pertaining to these static objects, possibly in conjunction with sensor data collected by one or more sensors coupled to the AV, enables the AV system to prepare a 3D vector map of an environment.

Lighting, and the dynamic range of light, are not uniform while driving. These values can alter drastically while driving, over an entire viewable environment surrounding the AV and/or over a portion of that environment. Due to these changes, a singular exposure setting is not suitable for the one or more cameras 136 coupled to the AV since the one or more static objects may not be viewable under certain lighting conditions. Therefore, in order to visually examine static objects present in the AV's surrounding environment, the exposure settings for an image captured by the one or more cameras 136 must be configured to be dynamically adjusted based on the lighting conditions surrounding the AV. According to various embodiments, these exposure settings may adjust over an entire image and/or over a portion of an image.

According to various embodiments, the AV control system 120 incorporates one or more Auto Exposure Control (AEC) algorithms to automatically adjust exposure settings for one or more images captured by the one or more cameras 136. However, in order to maximize the viewability of a static object, the static object's position within the image must be known. The cameras 136, motion sensors 138, 140, and/or other sensing devices 142, 160, 162, 164, 166, 168 enable the AV computing device 110 to determine the position of the AV. This further enables the AV computing device 110 to develop a coordinate system of the environment surrounding the AV for one or more of the images captured by the one or more cameras 136. Knowledge of the pose and calibration of the AV further enables objects from the 3D vector map to be projected into the coordinate system of the one or more camera images. According to various embodiments, this information is used by the AEC algorithms, which can then be used to prioritize auto exposure settings for one or more static objects of interest. For example, if the static object of interest is near saturation, an AEC algorithm may be made to calculate auto-exposure settings such that details in the static object of interest is preserved.

For example, at tunnel entry and exit points, camera image scenes are often of high dynamic range, limiting the viewability of details of the environment and/or any static or moving actors within tunnel entry or exit points. This could result in a loss of image details, depending on whether the entry point or exit point is prioritized. In order to minimize the loss of image details, one or more designated sections of the image are isolated via, for example, a bounding box.

Figure 2:
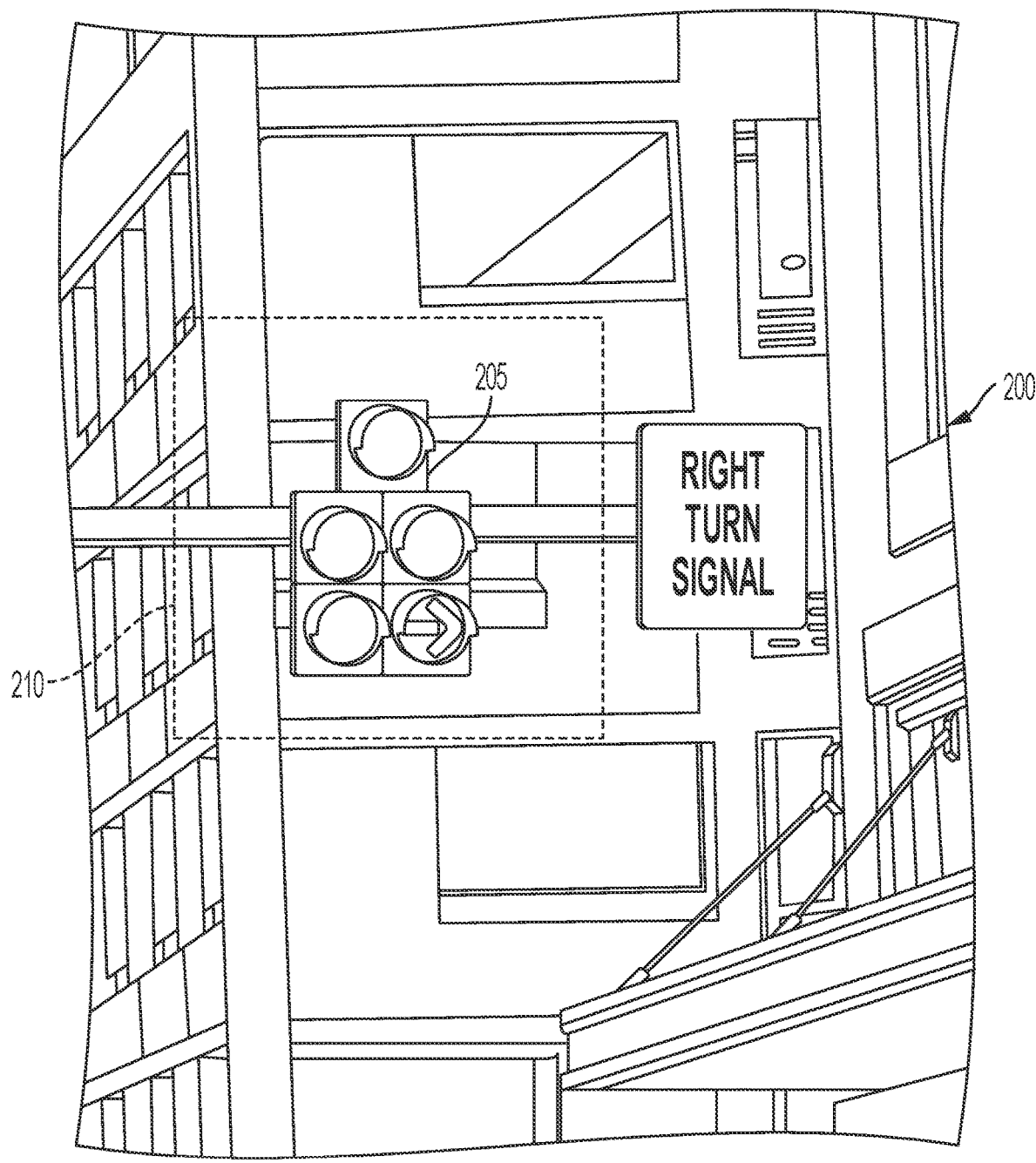
FIG. 2 illustrates an image captured by a camera of an autonomous vehicle (AV), in accordance with various embodiments of the present disclosure.

Referring now to FIG. 2, an image 200 captured by a camera 136 of an AV is illustratively depicted.

As shown in FIG. 2, the image 200 includes a static object 205. A region of interest is designated by a bounding box 210. According to various embodiments, map data and present location of the AV and the camera to determine the region of interest in the field of view of the camera such that the region of interest is a region of the image that is expected to contain one or more static objects of interest 205.

According to various embodiments, the bounding box location information enables the one or more AEC algorithms to preserve needed details of one or more objects and/or actors within the bounding box.

Figure 3:
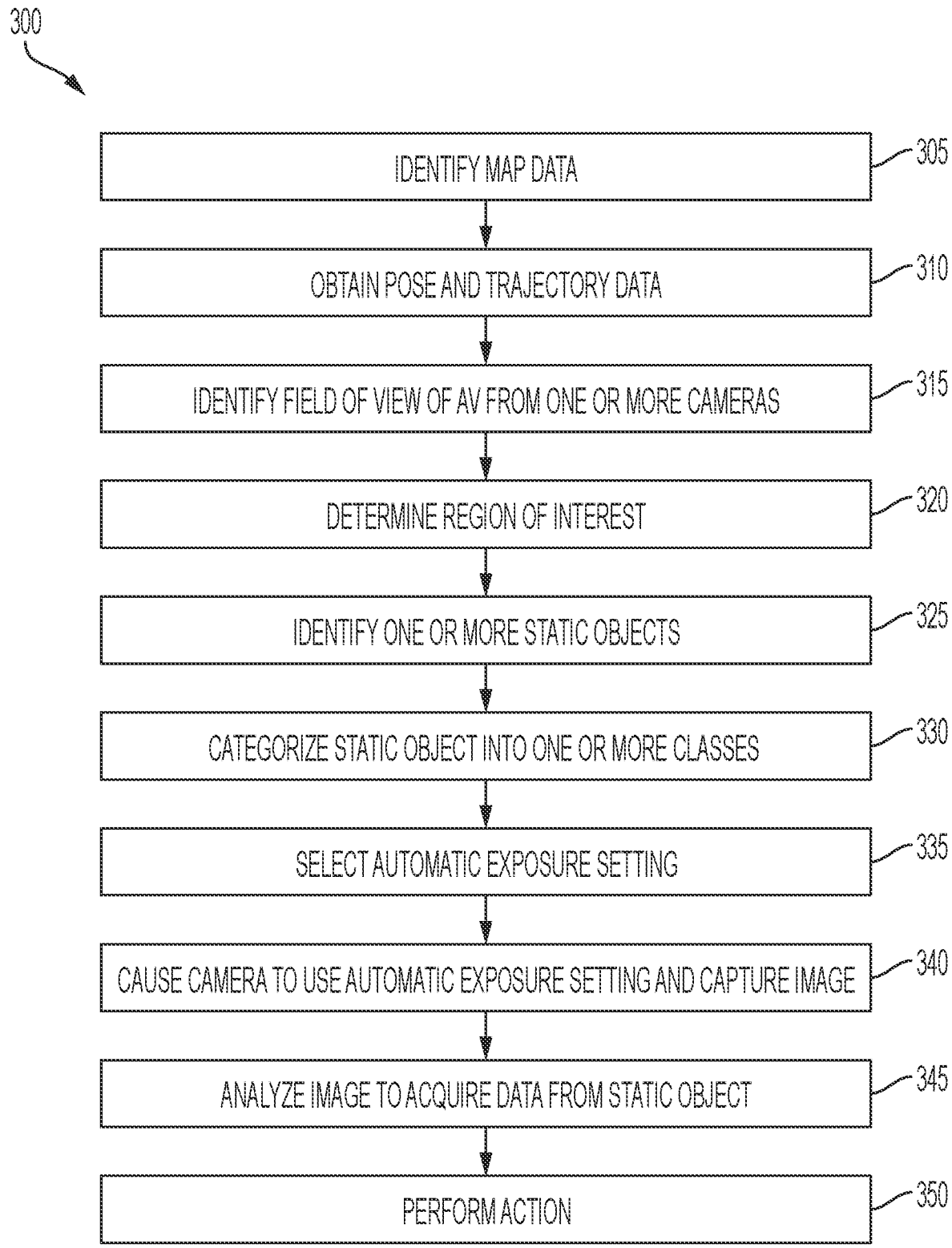
FIGS. 3-4 illustrate a flowchart of a method for operating a vehicle, in accordance with various embodiments of the present disclosure.
Figure 4:
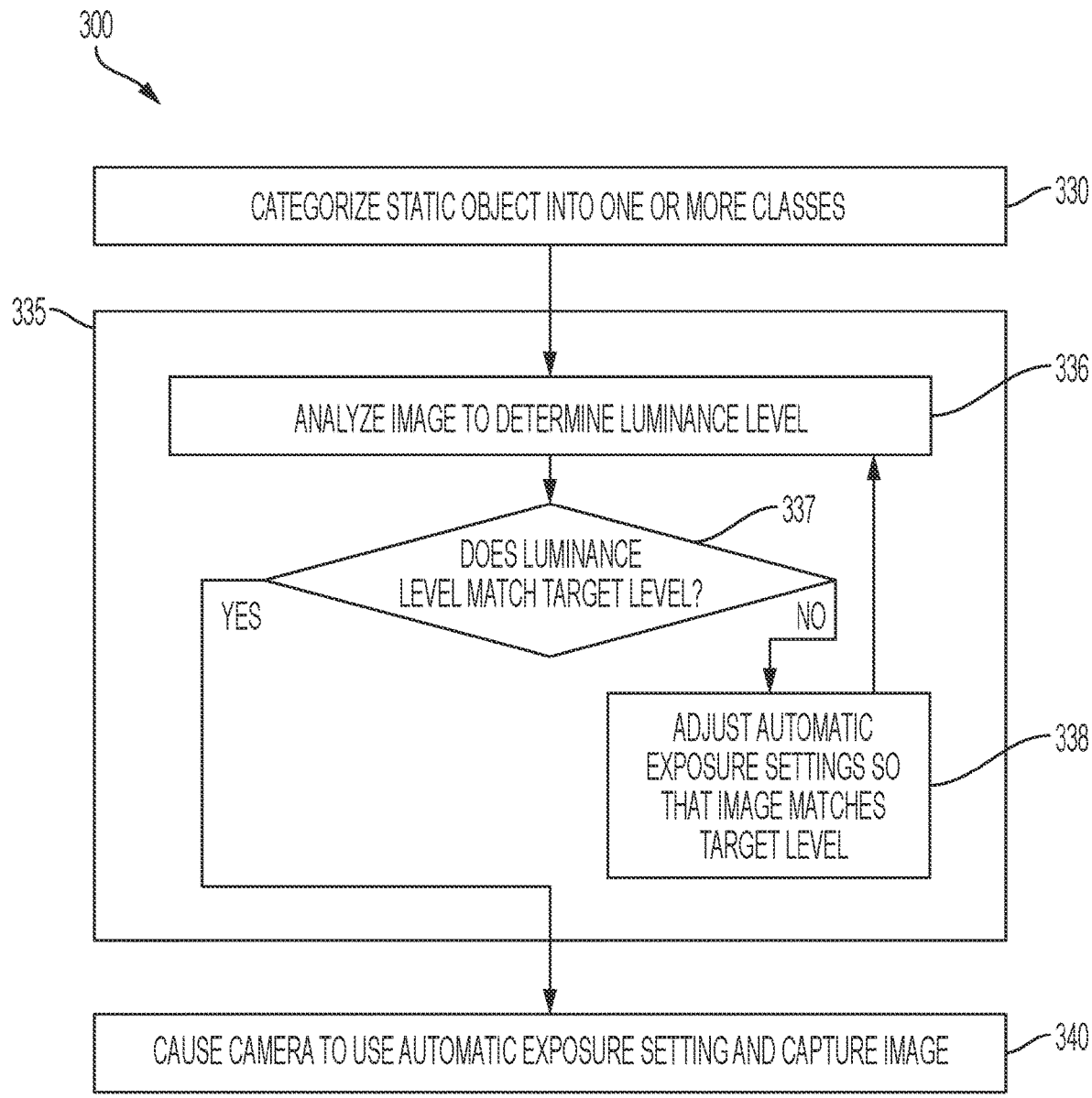

Referring now to FIGS. 3-4, a method 300 of operating a vehicle is illustratively depicted, in accordance with various embodiments of the present disclosure.

At 305, an AV control system of an AV identifies map data for a present location of the AV using a location of the AV and pose and trajectory data for the AV. The map data may be pre-loaded onto the AV, may be accessed via, for example, the cloud, may be calculated via one or more sensors coupled to, or accessed by, the AV, and/or through other suitable means.

For example, the GPS may be used to determine or estimate a geographical location of the AV. To this end, the GPS may include a transceiver configured to estimate a position of the AV with respect to the Earth, based on satellite-based positioning data. In an example, the system may be configured to use the GPS in combination with the map data to estimate a location of a lane boundary on a road on which the AV may be travelling.

The AV computing device may be configured to determine the location, orientation, pose, etc. of the AV in the environment (localization) based on, for example, 3-dimensional position data (e.g., data from a GPS), 3-dimensional orientation data, predicted locations, or the like. For example, the AV computing device may receive GPS data to determine the AV's latitude, longitude and/or altitude position. Other location sensors or systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location. The map data can provide information regarding: the identity and location of different roadways, road segments, lane segments, buildings, or other items; the location, boundaries, and directions of traffic lanes (e.g., the location and direction of a parking lane, a turning lane, a bicycle lane, or other lanes within a particular roadway), and metadata associated with traffic lanes; traffic control data (e.g., the location and instructions of signage, traffic signals, or other traffic control devices); and/or any other map data that provides information that assists the AV computing device in analyzing the surrounding environment of the AV. According to various embodiments, the AV may receive one or more location details and/or map data from one or more nodes. The nodes may be installed in or near a road. According to various embodiments, the node includes a transmitter configured to transmit location data using beacon technology. The beacon technology may be used in smart city infrastructure installations.

The map data may also include information and/or rules for determining right of way of objects and/or vehicles in conflicted areas or spaces. A conflicted space (or conflicted area) refers to an area where more than one object and/or vehicle may be predicted to be present at the same time leading to a risk collision, unless one of the objects and/or vehicles is given precedence (i.e., right of way) to traverse the conflicted space. Examples of such conflicted spaces can include traffic signals, intersections, stop signs, roundabouts, turns, crosswalks, pedestrian crossings etc. The right of way information and/or rules for a conflicted space may be derived from traffic laws and rules associated with a geographical area (and may not be the same for all spaces).

In certain embodiments, the map data may also include reference path information that corresponds to common patterns of vehicle travel along one or more lanes such that the motion of the object is constrained to the reference path (e.g., locations within traffic lanes on which an object commonly travels). Such reference paths may be pre-defined, such as the centerline of the traffic lanes. Optionally, the reference path may be generated based on one or more historical observations of vehicles or other objects over a period of time (e.g., reference paths for straight line travel, lane merging, turning, or the like).

In certain embodiments, the AV computing device may also include and/or may receive information relating to the trip or route of a user, real-time traffic information on the route, or the like.

According to various embodiments, the present location of the vehicle may be determined using sensors such as, for example, GPS and motion sensors and/or through other suitable means of location detection. According to various embodiments, the AV control system may further determine a location and orientation of one or more cameras positioned on and/or coupled to the AV. According to various embodiments, at 310, pose data, as described above, and trajectory data may additionally be obtained for the AV, as described above. For example, trajectory data may be obtained or determined using for example, kinematic history data from the AV, a predetermined route of the AV, and/or other suitable means. According to various embodiments, the trajectory data may be used to calculate or update map data.

The AV control system, using the present location of the AV and the location and orientation of the one or more cameras, identifies, at 315, a field of view of the AV from each of the one or more cameras of the AV. Each camera coupled to the AV includes a field of view. A position and/or orientation of the camera in relation to the AV may be predetermined or pre-loaded, and/or, in the event that a camera moves with relation to the AV, is dynamically calculated. As described above, the position/location and orientation of the AV is calculated. Based on both the position/location and orientation of the AV in the environment and the position/location and orientation of each of the cameras in relation to the AV, the field of view of each of the cameras in relation to the environment can be calculated.

The map data includes the position and orientation of one or more static objects that are, or are going to be, in the field of view of the AV. At 320, the AV control system uses the map data and present location of the AV and the camera to determine a region of interest in the field of view of the camera which is expected to contain one or more static objects of interest. Based on the map data, and the field of view of each of the cameras coupled to the AV, the AV computing device can calculate a general position within the field of view of one or more cameras where one or more static objects of interest should be located. This general position correlates to the region of interest. According to various embodiments, the region of interest may further include a buffer region surrounding the general position within the field of view of the one or more cameras where the one or more static objects of interest should be located.

Using this information, at 325, the AV control system analyzes the map data to identify one or more static objects that are expected to be in the field of view of one or more cameras of the AV. At 330, the AV control system categorizes the one or more static objects into one or more classes of static object. The classes represent the type of object. For example, the one or more classes include traffic lights, traffic light posts, pedestrians, vehicles, fire hydrants, utility poles, and/or any other suitable class of object.

At 335, the AV control system selects an automatic exposure (AE) setting for the camera. According to various embodiments, the selected AE setting may be based on a class of a static object, one or more characteristics of a region of interest in the field of view of the AV, or both.

According to various embodiments, the AE settings may be based on, for example, a lookup table which correlates various aperture settings and shutter speed settings based on the level of light in the region of interest, the motion of the AV and/or the camera coupled to the AV in relation to a static object within the region of interest, and/or other suitable characteristics which may affect image exposure.

According to various embodiments, selecting the AE setting, at 335, can include, as shown in FIG. 4, analyzing, at 336, the image of the field of view of the AV, captured by the camera, to determine a luminance level of one or more pixels located within the region of interest. It is then determined, at 337, whether the luminance level of the pixels within the region of interest matches a target level. The target level may be performed empirically and/or may be determinant upon the class of the static object. According to various embodiments, each class of object can be associated with particular luminance settings and/or a range of luminance settings.

If the luminance level of the pixels within the region of interest does not match the target level, then, at 338, the AV control system adjusts the AE settings such that the luminance of pixels in the one or more images in the field of view of the AV captured by the one or more cameras is consistent with the target level. Once the AE settings are adjusted, it is then analyzed, at 336, to determine a luminance level of one or more pixels located within the region of interest. It is then determined, at 337, whether the luminance level of the pixels within the region of interest matches the target level.

If the luminance level of the pixels within the region of interest matches the target level, the AE setting is selected and, at 340, the AV control system causes the camera to use the AE setting when capturing one or more images of the object.

Once the luminance of pixels is consistent with the target level, then the image, at 345, is analyzed to acquire data pertaining to the static object. For example, if the static object is a traffic signal, the image of the traffic signal is analyzed to determine a state of the traffic signal such as, for example, whether a green, yellow, or red light is currently lit.

Once the static object from the image is analyzed and the data acquired, the AV control system, at 360, performs an action. The action may include, for example, altering the trajectory of the AV, altering the velocity of the AV, and/or any other suitable action configured to avoid a conflict with one or more actors.

Figure 5:
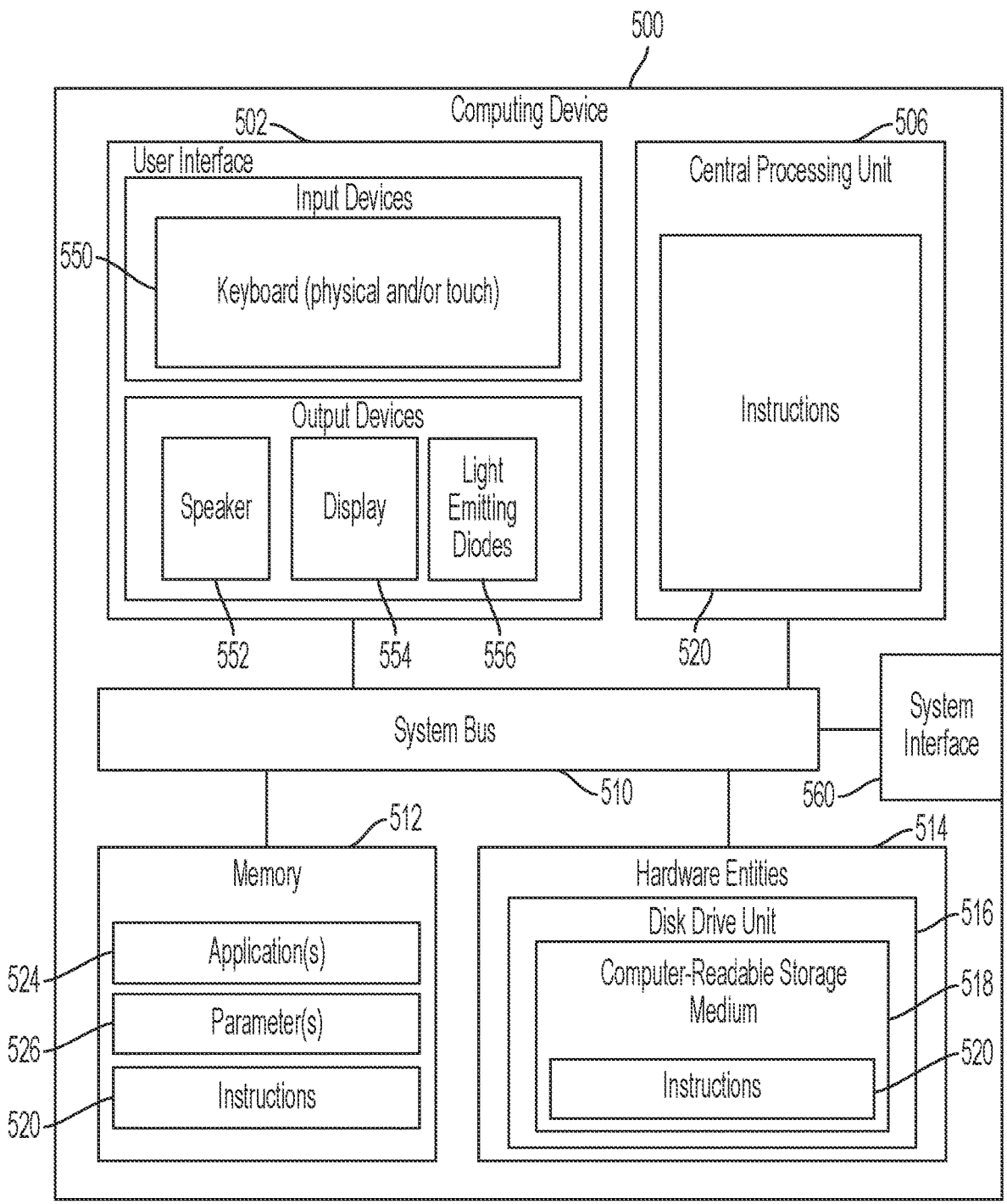
FIG. 5 is an illustration various elements of an illustrative computing device, in accordance with the present disclosure.

Referring now to FIG. 5, there is provided an illustration of an illustrative architecture for a computing device 500 such as the AV computing device 120. The computing device 500 may be a standalone device, incorporated into an AV or other suitable vehicle or device, a plurality of devices electronically coupled and/or in electronic communication with one another, or other suitable form of electronic device. The computing device 500 may include or be used with an AV system architecture such as that described above and in FIG. 1.

Computing device 500 may include more or less components than those shown in FIG. 7. However, the components shown are sufficient to disclose an illustrative solution implementing the present solution. The hardware architecture of FIG. 5 represents one implementation of a representative computing device configured to automatically adjust exposure settings for one or more cameras of an AV. As such, the computing device 500 of FIG. 5 implements at least a portion of the method(s) described herein.

Some or all components of the computing device 500 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 5, the computing device 500 comprises a user interface 502, a Central Processing Unit ("CPU") 506, a system bus 510, a memory 512 connected to and accessible by other portions of computing device 500 through system bus 510, a system interface 560, and hardware entities 514 connected to system bus 510. The user interface can include input devices and output devices, which facilitate user-software interactions for controlling operations of the computing device 500. The input devices include, but are not limited to, a camera, a motion sensor, a physical and/or touch keyboard 550, and/or other suitable input devices. The input devices can be connected to the computing device 500 via a wired or wireless connection (e.g., a Bluetooth® connection). The output devices include, but are not limited to, a speaker 552, a display 554, and/or light emitting diodes 556. System interface 560 is configured to facilitate wired or wireless communications to and from external devices (e.g., network nodes such as access points, etc.).

At least some of the hardware entities 514 perform actions involving access to and use of memory 512, which can be a random access memory ("RAM"), a disk drive, flash memory, a compact disc read only memory ("CD-ROM") and/or another hardware device that is capable of storing instructions and data. Hardware entities 514 can include a disk drive unit 516 comprising a computer-readable storage medium 518 on which is stored one or more sets of instructions 520 (e.g., software code) configured to implement one or more of the methodologies, procedures, or functions described herein. The instructions 520 can also reside, completely or at least partially, within the memory 512 and/or within the CPU 506 during execution thereof by the computing device 500. The memory 512 and the CPU 506 also can constitute machine-readable media. The term "machine-readable media", as used here, refers to a single medium or multiple media (e.g., a centralized or distributed database, and/or associated caches and servers) that store the one or more sets of instructions 520. The term "machine-readable media", as used here, also refers to any medium that is capable of storing, encoding or carrying a set of instructions 720 for execution by the computing device 500 and that cause the computing device 500 to perform any one or more of the methodologies of the present disclosure.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method of controlling an automatic exposure (AE) setting for a camera, the method comprising:
   identifying map data for a present location of a camera;
   analyzing the map data to identify an object that is expected to be in a field of view of the camera;
   using the map data to determine a region of interest in the field of view of the camera, the region of interest expected to contain the object;
   causing the camera to capture an image including the region of interest;
   selecting an automatic exposure (AE) setting for the camera based on luminance levels of pixels in the region of interest; and
   causing the camera to use the AE setting to capture images of the object.

2. The method of claim 1, further comprising determining a class of the object, wherein selecting the AE setting for the camera comprises selecting the AE setting based on the class of the object and a lookup table which correlates one or more camera settings with the luminance of the pixels in the region of interest.

3. The method of claim 1, wherein the selecting the AE setting further comprises:
   causing the camera to capture a second image including the region of interest in the field of view of the camera; and
   determining whether a luminance level of the pixels within the region of interest of the second captured image satisfies a threshold luminance level.

4. The method of claim 3, further comprising, in response to the luminance level of the pixels within the region of interest not satisfying the threshold luminance level, adjusting the AE setting until the luminance level of the pixels in the region of interest satisfies the threshold luminance level.

5. The method of claim 1, further comprising analyzing the images of the object to acquire data pertaining to the object.

6. The method of claim 1, further comprising analyzing the images to determine state of the object.

7. The method of claim 1, wherein the region of interest is a region of the field of view of the camera that is expected to contain the object.

8. A system comprising:
   a camera having a controllable automatic exposure (AE) setting;
   a processor; and
   a computer-readable memory containing programming instructions that are configured to cause the processor to:
      identify map data for a present location of a camera;
      analyze the map data to identify an object that is expected to be in a field of view of the camera;
      use the map data to determine a region of interest in the field of view of the camera, the region of interest expected to contain the object;
      cause the camera to capture an image including the region of interest;
      select an automatic exposure (AE) setting for the camera based on luminance levels of pixels in the region of interest; and
      causing the camera to use the AE setting to capture images of the object.

9. The system of claim 8, wherein:
   the programming instructions are further configured to cause the processor to determine a class of the object; and
   the programming instructions that are configured to cause the processor to select the AE setting comprise programming instructions that are configured to cause the processor to select the AE setting based on the class of the object and a lookup table which correlates one or more camera settings with the luminance of the pixels in the region of interest.

10. The system of claim 8, wherein the programming instructions that are configured to cause the processor to select an AE setting comprise programming instructions that are configured to:
   cause the camera to capture a second image including the region of interest in the field of view of the camera; and
   determine whether a luminance level of the pixels within the region of interest of the second captured image satisfies a threshold luminance level.

11. The system of claim 10, wherein the programming instructions are further configured to, in response to the luminance level of the pixels within the region of interest not satisfying the threshold luminance level, adjust the AE setting until the luminance level of the pixels in the region of interest satisfies the threshold luminance level.

12. The system of claim 8, wherein the programming instructions are further configured to analyze the images of the object to acquire data pertaining to the object.

13. The system of claim 8, wherein the region of interest is a region of the field of view of the camera that is expected to contain the object.

14. The system of claim 8, wherein the camera is a camera of a vehicle, the camera configured to capture images of an environment in which the vehicle is traveling.

15. A non-transitory computer-readable medium that stores instructions that are configured to, when executed by at least one computing device, cause the at least one computing device to perform operations comprising:
   identifying map data for a present location of a camera;
   analyzing the map data to identify an object that is expected to be in a field of view of the camera;
   using the map data to determine a region of interest in the field of view of the camera, the region of interest expected to contain the object;
   causing the camera to capture an image including the region of interest;
   selecting an automatic exposure (AE) setting for the camera based on luminance levels of pixels in the region of interest; and
   causing the camera to use the AE setting to capture images of the object.

16. The non-transitory computer-readable medium of claim 15, wherein the instructions further cause the at least one computing device to determine a class of the object; and
   the instructions that cause the at least one computing device to select the AE setting comprise instructions that cause the at least one computing device to select the AE setting based on the class of the object and a lookup table which correlates one or more camera settings with the luminance of the pixels in the region of interest.

17. The non-transitory computer-readable medium of claim 15, wherein the instructions that cause the at least one computing device to select the AE setting comprise instructions that cause the at least one computing device to:
   cause the camera to capture a second image including the region of interest in the field of view of the camera; and
   determine whether a luminance level of the pixels within the region of interest of the second captured image satisfies a threshold luminance level.

18. The non-transitory computer-readable medium of claim 17, wherein the instructions further cause the at least one computing device to, in response to the luminance level of the pixels within the region of interest not satisfying the threshold luminance level, adjust the AE setting until the luminance level of the pixels in the region of interest satisfies the threshold luminance level.

19. The non-transitory computer-readable medium of claim 15, wherein the instructions further cause the at least one computing device to analyze the images of the object to acquire data pertaining to the object.

20. The non-transitory computer-readable medium of claim 15, wherein the region of interest is a region of the field of view of the camera that is expected to contain the object.

* * * * *